US009280988B1

(12) United States Patent
Lakshmikumaran et al.

(10) Patent No.: US 9,280,988 B1
(45) Date of Patent: Mar. 8, 2016

(54) TAPE HEAD SURFACE WITH NON-UNIFORM CROSS-WIDTH EDGE PROFILES

(71) Applicant: Oracle International Corporation, Redwood City, CA (US)

(72) Inventors: Anand V. Lakshmikumaran, Denver, CO (US); Joseph E. Torline, Arvada, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/477,526

(22) Filed: Sep. 4, 2014

(51) Int. Cl.
*G11B 5/10* (2006.01)
*G11B 5/187* (2006.01)
*G11B 15/00* (2006.01)
*G11B 5/29* (2006.01)

(52) U.S. Cl.
CPC *G11B 5/187* (2013.01); *G11B 5/10* (2013.01); *G11B 5/1871* (2013.01); *G11B 5/29* (2013.01); *G11B 15/005* (2013.01)

(58) Field of Classification Search
CPC ........... G11B 5/10; G11B 5/1871; G11B 5/29
USPC .................. 360/121, 122, 128, 129
See application file for complete search history.

(56) References Cited

U.S. PATENT DOCUMENTS

| 4,758,916 | A | * | 7/1988 | Niwa et al. ..................... 360/121 |
| 5,751,527 | A | * | 5/1998 | Sundaram et al. ............. 360/122 |
| 6,097,570 | A | * | 8/2000 | Dee .......................... G11B 5/10 |
| | | | | 360/121 |
| 7,154,691 | B2 | * | 12/2006 | Girvin et al. ..................... 360/61 |
| 8,373,944 | B2 | | 2/2013 | Biskeborn |
| 8,797,682 | B1 | * | 8/2014 | Biskeborn et al. ............. 360/121 |
| 2005/0018349 | A1 | * | 1/2005 | Eaton ............................. 360/129 |
| 2012/0008234 | A1 | * | 1/2012 | Biskeborn et al. .......... 360/77.12 |

* cited by examiner

*Primary Examiner* — Jefferson Evans
(74) *Attorney, Agent, or Firm* — Marsh Fischmann & Breyfogle LLP; Jonathon A. Szumny

(57) ABSTRACT

A tape head having offset transducer spans between adjacent modules of the tape head that serves to maintain the balance between debris removal and reduced magnetic layer/recording device spacing on the one hand and reduced tape/tape head friction on the other hand. In one aspect, opposite edges of each module are relatively sharper adjacent the transducer span and relatively rounded (e.g., less sharp) away from the transducer span. The sharp edges reduce magnetic spacing loss and scrape debris off of the tape while the rounded edges reduce or eliminate contact between the tape and the head in regions where no transducer spans are present and thus where no tape writing or reading would be taking place.

19 Claims, 4 Drawing Sheets

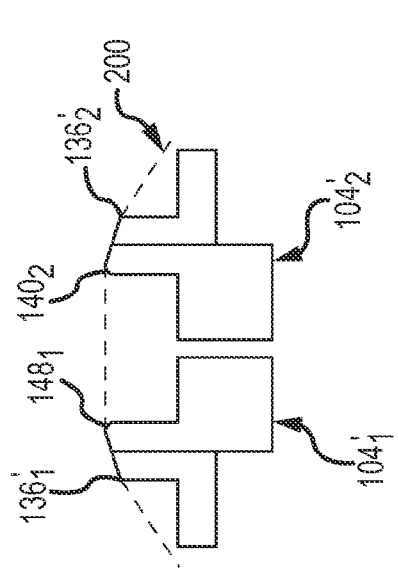
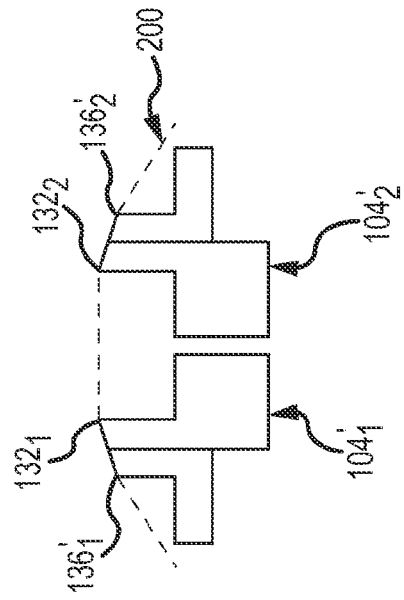
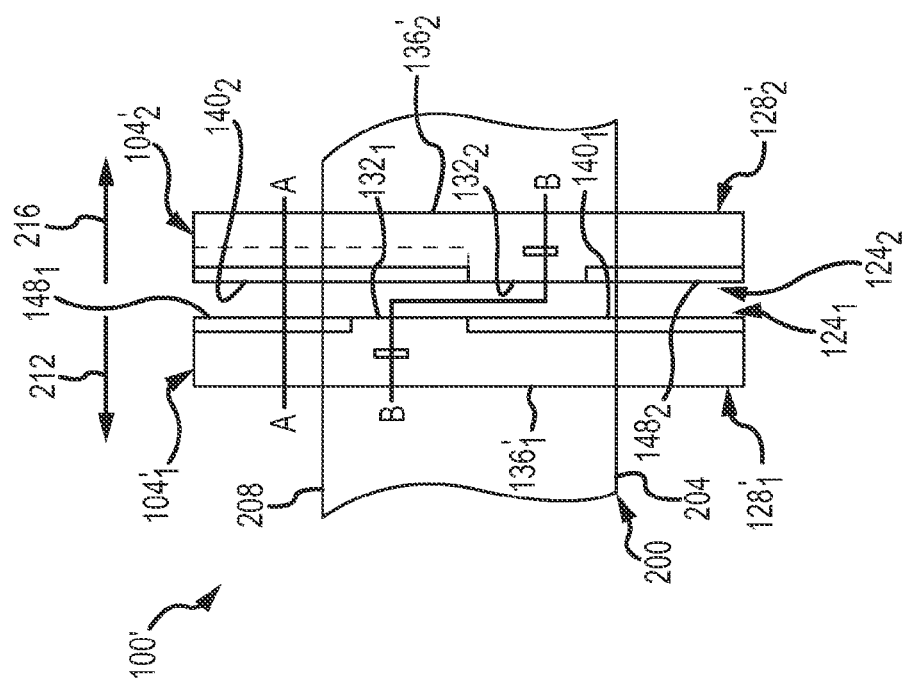

TAPE HEAD SURFACE WITH NON-UNIFORM CROSS-WIDTH EDGE PROFILES

BACKGROUND

1. Field of the Invention

The present invention generally relates to the storing of data on magnetic tape media and, more particularly, to tape heads for writing data to and reading data from magnetic tape media.

2. Relevant Background

The market for mass storage devices is growing at an ever increasing rate with the sales of high-performance computers penetrating numerous industries ranging from financial institutions to oil exploration companies. The processing power of these high-performance systems, and the data they generate, is increasing faster than the ability of storage devices to keep pace. The problem of data storage and rapid retrieval is particularly pronounced in computational-intensive applications which create huge amounts of data that need to be accessed in seconds rather than minutes, hours or even days.

Magnetic disks remain the preferred media for direct access to frequently used files because of their fast access times. However, because of their high cost per-unit of storage and limited capacity, magnetic disk recorders are prohibitively expensive and therefore impractical for large-scale data storage. With the advances in magnetic tape technology, tape based systems remain the preferred choice for mass data storage. In addition to cost, magnetic tape exceeds the storage density of almost any other medium, at least from a volumetric standpoint, because tape is a much thinner medium than, for example, magnetic disks, and tape can be tightly packed.

Magnetic tape (e.g., recording tape) is a magnetic recording medium made of a thin magnetizable coating on a long, narrow strip of plastic which is typically stored in the form of a spool on a cartridge or cassette. Typically, multiple, parallel data tracks may be written to and/or read data from the tape in one of a number of manners. In "linear" or "longitudinal" reading or recording, data is read or recorded by one or more tape heads (e.g., each including one or more tape head modules that each have a plurality of read or write elements such as 16, 32, etc.) of a tape drive or recording device by moving the tape relative to the tape head(s) from a starting point on the first track of the tape and moving linearly down the tape along the first track or along a first path. Once the physical end of the tape (EOT) is reached, the tape is rewound to the beginning of the tape (BOT) at which point each tape head begins reading or recording linearly down the tape along the second track or along a second path. Variations of the linear method include "serpentine" and "spiral in" reading and recording. One or more tracks written at the same time along the tape length may be referred to as a "wrap." In this regard, a new wrap begins each time the head assembly begins reading or writing in the forward or reverse directions. Often, magnetic tape is pre-formatted with a plurality of guards (i.e., strips of the tape on which user data cannot be written) running either perpendicular to the tape length (to separate the tape into a number of sections or segments) or along the tape length (to separate the tape into a number of servo portions or data bands on which independent read/write heads can operate).

SUMMARY

The tape head profile in the direction of tape motion, commonly referred to as the "contour," is generally designed to keep the moving tape in contact with the upper surface of the tape head. This is especially important in the region of the magnetic transducers (e.g., the string of read and/or write elements) as separation between the magnetic coating of the tape and the transducers can result in performance degradation (e.g., magnetic spacing loss). In order to achieve higher linear recording densities and support increases in tape cartridge storage capacity, recording tapes have continuously become smoother to reduce the spacing between the magnetic coating on the tape and the recording devices on the head. However, such reductions in magnetic layer/recording device spacing has resulted in corresponding increases in friction between the outer layer of the moving tape and the stationary head, thus creating complications with the precise control of the lateral head position relative to the recording tape (otherwise referred to as servo positioning) and with the control of the tape tension and tape speed. Increased track densities on the tape, reduced nominal tape tension (due to the use of thinner tapes), and increased tape speeds have served to exacerbate the requirements on lateral head position and tape motion control as well.

Typical approaches for reducing tape/tape head friction have included changes in the contour of the tape head (e.g., via tapering, curving, rounding, etc. one or more edges of the modules of the tape head) across at least a portion of the cross-width of the tape head. For instance, some previous arrangements have employed a uniformly curved or tapered profile along an entirety of the cross-width direction (i.e., direction perpendicular to tape motion) of the tape head. However, curving or tapering tape head module edges along an entirety of the tape head module edges can, while reducing tape/tape head friction, increase spacing between the magnetic layer of the tape and the recording devices (e.g., by creating an air layer therebetween) and reduce the degree to which debris can be scraped off of the tape as the tape travels over the tape head. Thus, there is a delicate balance that may need to be maintained between debris removal and the need to limit magnetic layer/recording device spacing on the one hand and limiting tape/tape head friction on the other hand.

Other previous approaches recognizing the above delicate balance have employed both flat/sharp and curved/tapered profiles along the cross-width of tape head module edges. As only a small region of the tape (e.g., small portion of the width) needs to be in contact with the head at any one time (e.g., because the length of recording element spans is typically only a fraction of the width of the tape, such as ¼, ⅛, 1/16, etc.), these approaches have utilized relatively flat/sharp edges that overlap the recording element spans (along the cross width of the tape head) and curved/tapered edges that do not overlap the recording element spans. In this regard, there is reduced friction between the tape head and those portions of the tape passing over the curved edges on one hand and reduced spacing and increased debris scraping in relation to those portions of the tape passing over the flat/sharp edges on the other hand.

However, these approaches have generally assumed that the recording elements on one module of a tape head are aligned with those of the one or more other modules of the tape head along the cross-width of the tape head (e.g., in a direction perpendicular to tape motion) so the same portion of the width of a tape (e.g., same data track(s)) simultaneously passes over adjacent recording element spans as the tape moves over the tape head. Thus, these approaches have typically maintained flat or sharp (i.e., non-curved, tapered, etc.) profiles along overlapping portions of the cross-widths of adjacent tape head modules that coincide with the aligned spans of recording elements; this arrangement does not necessarily account for respective spans of recording elements of adjacent modules of a tape head that are at least partially or fully offset along the cross-width of the tape head that would allow for substantially simultaneous reading and/or writing operations on different tracks of the tape. More specifically, offsetting one recording element span relative to an adjacent recording element span along the cross-width in these previous approaches can result in a portion of tape to be written or read by one of the recording element spans passing over a curved or tapered edge of a tape module just before passing over the recording element span and thus an increase in spacing between the magnetic layer of the tape and the recording element span. Such spacing increases frustrate the goal of achieving higher linear recording densities and increases in tape cartridge storage capacities.

In this regard, the inventors have determined a need for tape heads having offset transducer spans between adjacent modules of the tape heads that serve to maintain the balance between debris removal and reduced magnetic layer/recording device spacing on the one hand and reduced tape/tape head friction on the other hand. In one aspect, a magnetic head for performing at least one of reading operations and writing operations on a magnetic tape is disclosed. The magnetic head includes a first module including a body with an upper surface and a span of transducers on the upper surface that is configured to face a magnetic tape traveling over the upper surface along a direction of travel, where the upper surface includes at least a first edge portion having a first profile in a first region aligned with the span of transducers, where the upper surface includes at least a second edge portion having a second profile in a second region that is offset from the first region along a direction that is perpendicular to the direction of travel, and where the first profile is sharper than the second profile.

The disclosed magnetic head also includes a second module including a body with an upper surface and a span of transducers on the upper surface that is configured to face the magnetic tape traveling over the upper surface along the direction of travel, where the upper surface includes at least a first edge portion having a first profile in a first region aligned with the span of transducers, where the upper surface includes at least a second edge portion having a second profile in a second region that is offset from the first region along a direction that is perpendicular to the direction of travel, where the first profile is sharper than the second profile, and where the span of recording transducers of the first module is at least partially offset from the span of transducers of the second module along the direction perpendicular to the direction of travel.

In one arrangement, the upper surface of the first module has a first edge that includes the first and second edge portions of the upper surface of the first module and/or the upper surface of the second module has a first edge that includes the first and second edge portions of the upper surface of the second module. For instance, the first edge portion of the upper surface of the first module may be at least partially offset from the first edge portion of the upper surface of the second module along the direction perpendicular to the direction of travel.

In another aspect, a method of operating a tape drive includes first moving a tape over a first module of a tape head, where the first moving includes passing a first portion of the tape over a span of transducers of the first module, passing the first portion over a first edge portion of the first module, and passing a second portion of the tape over a second edge portion of the first module, where the second portion of the tape is spaced from the first portion of the tape along a reference line that is perpendicular to first and second opposite lateral edges of the tape, and where the first edge portion of the first module is sharper than the second edge portion of the first module.

The disclosed method also includes second moving the tape over a second module of the tape head, where the second moving includes passing the second portion of the tape over a first edge portion of the second module, passing the second portion of the tape over a span of transducers of the second module, and passing the first portion of the tape over a second edge portion of the second module, where the first edge portion of the second module is sharper than the second edge portion of the second module.

In a further aspect, a magnetic head for a tape drive includes a first module including first and second opposite edges and a span of transducers between the first and second edges, where first portions of the first and second edges that overlap the span of transducers along a length of the first module have a first profile, where second portions of the first and second edges that do not overlap the span of transducers along the length of the first module have a second profile, and where the first profile is sharper than the second profile. The magnetic head also includes a second module including first and second opposite edges and a span of transducers between the first and second edges, where first portions of the first and second edges that overlap the span of transducers along a length of the second module have a first profile, where second portions of the first and second edges that do not overlap the span of transducers along the length of the second module have a second profile, where the first profile is sharper than the second profile, and where the first portions of the first module and the first portions of the second module are at least partially non-overlapping along the lengths of the first and second modules.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 2b is a sectional view (along A-A) of the plan view of FIG. 2a.

FIG. 2c is another sectional view (along B-B) of the plan view of FIG. 2a.

FIG. 4a is a simplified schematic plan view of a tape head of a tape drive according to another embodiment.

FIG. 4b is a sectional view of the plan view of FIG. 4a.

FIG. 4c is another sectional view of the plan view of FIG. 4a.

DETAILED DESCRIPTION

Disclosed herein are utilities (e.g., apparatuses, systems, methods, etc.) for maintaining the delicate balance between reduced magnetic layer/transducer spacing and tape debris removal on the one hand and reduced tape/tape head friction on the other hand during movement of a magnetic tape over a tape head having adjacent modules with offset transducer spans. In one aspect, opposite edges of each module are relatively sharper adjacent the transducer span and relatively rounded (e.g., less sharp) away from the transducer span. The sharp edges reduce magnetic spacing loss and scrape debris off of the tape while the rounded edges reduce or eliminate contact between the tape and the head in regions where no transducer spans are present and thus where no tape writing or reading would be taking place.

Figure 1:
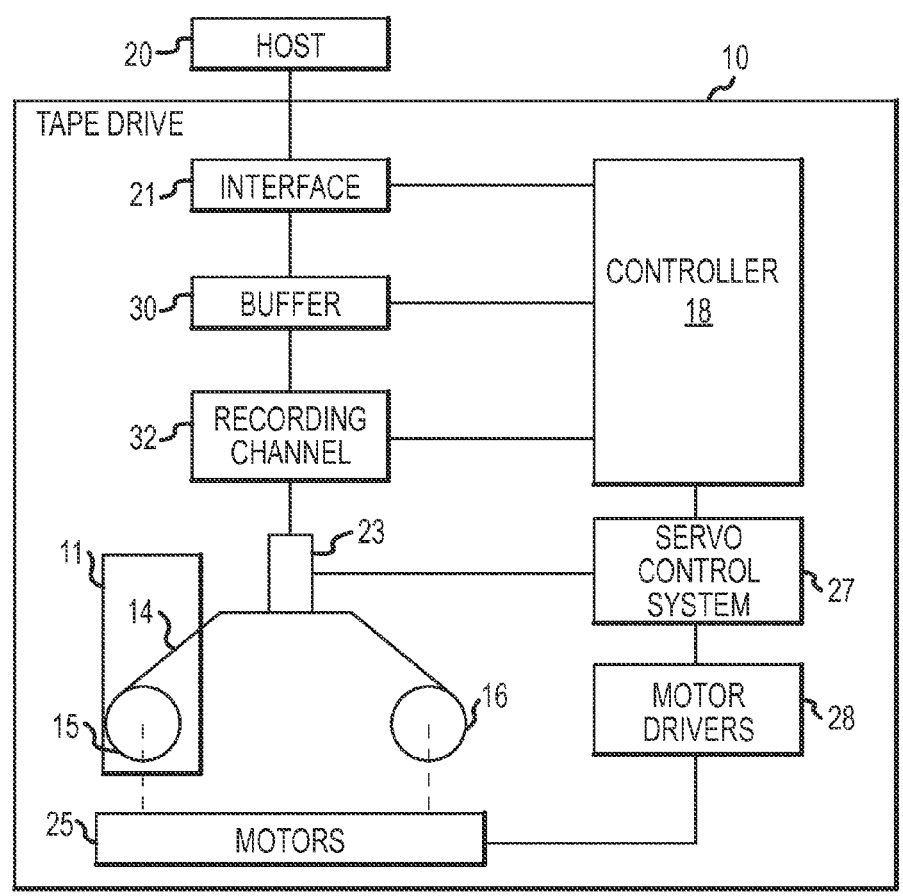
FIG. 1 is a schematic view of an exemplary tape drive that may be adapted to implement the various utilities disclosed herein.

Before discussing the disclosed utilities in more detail, reference is initially made to FIG. 1 which presents a schematic view of an exemplary tape drive 10 and a magnetic tape cartridge 11 that may be adapted to implement the various utilities disclosed herein (although it is to be understood that numerous other forms of tape drives may be used to implement the disclosed utilities, such as single reel tape drives, dual reel cartridges, and the like). The magnetic tape cartridge 11 in FIG. 1 includes a length of magnetic tape 14 (e.g., magnetic tape pack, magnetic tape media) wound on at least one reel 15. The tape drive 10 may include one or more controllers 18 of a recording system for operating the tape drive 10 in accordance with commands received from a host system 20 received at an interface 21. The tape drive 10 may be coupled to the host system 20 in a number of manners such as directly, through a library, or over a network (e.g., via Small Computer Systems Interface (SCSI), Fibre Channel Interface, and the like). The tape drive 10 may be a standalone unit or form part of a tape library or other subsystem.

The magnetic tape cartridge 11 may be inserted into the tape drive 10 and loaded by the tape drive 10 so that the tape 14 winds around a reel 16 of the tape drive 10 and so that at least one tape head assembly 23 of the recording system (e.g., each including one or more tape heads, tape guides, or the like) reads and/or writes information with respect to the tape 14 as the tape 14 is moved longitudinally in first/forward and/or second/reverse opposed directions past the tape head assembly 23 along a course by one or more motors 25. For instance, each tape head may include one or more tape head modules, where each module includes a plurality (e.g., span) of read elements, write elements, and/or servo elements for use in respectively reading data from the tape 14, writing data to the tape 14, and maintaining precise control of the tape head assembly 23 with respect to the tape 14.

The tape 14 may include a plurality of parallel data tracks that may be read and/or written by the at least one tape head of the tape head assembly 23. In some formats, the tracks may be written and/or read in a serpentine, back and forth manner; in a spiral-in manner; and the like. The recording system may include a servo control or tracking system 27 to electronically switch from one tape head to another tape head assembly 23; to seek and move a tape head assembly 23 laterally relative to the tape 14 (e.g., perpendicular to a direction of movement or course of the tape 14); to position the a tape head at a desired location over the tape 14 and/or one or more tracks of the tape 14; to follow one or more desired tracks; and/or the like. The servo control system 27 may also control the operation of the motors 25 through motor drivers 28 in response to instructions by the one or more controllers 18, where the controllers 18 may provide the data flow and formatting of data to be read from and written to the magnetic tape 14 (e.g., via employing a buffer 30 and a recording channel 32). The various components of the tape drive 10 may be incorporated or otherwise embodied within any appropriate housing (not shown).

FIGS. 2a-2c and 3 present various views of a tape head 100 (e.g., part of tape head assembly 23 of FIG. 1) for use in writing data to and/or reading data from a length of magnetic tape 200 (e.g., tape 14 of FIG. 1) that is operable to move in opposite first and second directions 212, 216 along a course or path over the tape head 100 according to one embodiment. Broadly, the tape head 100 may include at least first and second tape head modules $104_1$, $104_2$ that each include a span (e.g., such as 16, 32, etc.) of elements (e.g., read, write, and/or servo read transducers) 106 such as first and second sets $106_1$, $106_2$ of elements on upper surfaces $116_1$, $116_2$ thereof. Each span 106 of elements may be appropriately disposed on a "bump" of the respective tape head module 104 and may include one or more servo read elements (not shown) that are configured to read corresponding servo patterns (not shown) on the surface of the tape 200.

Any appropriate servo control system (e.g., servo control system 27 of FIG. 1) may utilize information received from the servo read elements as the servo read elements are reading the servo patterns for purposes of maintaining alignment of the read and write elements over desired locations or positions on the tape 200. In addition to one or more tape head modules 104, the tape head 100 may also include one or more tape guides (e.g., outriggers, etc., not shown) over which the tape 200 is configured to pass for purposes of supporting the entire width of the tape 200, presenting the tape 200 to the tape head modules 104 with an appropriate contact angle to maintain appropriate contact pressure between the tape 200 and the tape head modules 104, and the like. Numerous additional components of the tape head 100 have been omitted from the drawings and this discussion in the interest of clarity.

As shown, the span $106_1$ of elements of the first module $104_1$ is at least partially offset from or non-overlapping with the span $106_2$ of elements of the second module $104_2$ along a cross-width 112 (e.g., length) of the tape head 100 (i.e., in a direction perpendicular to the first and second directions of travel 212, 216 of the tape 200). In this regard, a particular portion (e.g., track) of the tape 200 that passes over the span $106_1$ of elements of the first module $104_1$ in one of the first and second directions 212, 216 does not then necessarily pass over the span $106_2$ of elements of the second module $104_2$ with the tape moving in the one of the first and second directions 212, 216. This arrangement allows for different reading and/or writing operations to be performed (e.g., by controller 18, servo control system 27, motor drivers 28, etc. of tape drive 10 of FIG. 1) on separate first and second portions (e.g., different tracks or different sets of tracks) of the tape 200 that are separated along a reference line or direction that is perpendicular to first and second opposite lateral edges 204, 208 of the tape 200 (e.g., along the cross-width 112 of the tape head 100).

Furthermore, the upper surfaces $116_1$, $116_2$ of the first and second modules $104_1$, $104_2$ may include at least first edge portions $132_1$, $132_2$ in respective regions of first edges $124_1$, $124_2$ thereof that are aligned with the spans $106_1$, $106_2$ (e.g., that overlap in the cross width 112 direction). The first edge portions $132_1$, $132_2$ are configured to scrape air entrained by the moving tape 200 to reduce the spacing between the magnetic layer of the tape 200 and the spans $106_1$, $106_2$ of elements and thereby facilitate accurate reading and/or writing operations on the tape 200. In this regard, each of the first edge portions $132_1$, $132_2$ may have a profile that is relatively sharp or pointed (e.g., a radius of curvature of not greater than about 0.1 mm). The upper surfaces $116_1$, $116_2$ of the first and second modules $104_1$, $104_2$ may also include first edge portions $136_1$, $136_2$ on second edges $128_1$, $128_2$ thereof (e.g., opposite and/or parallel to the first edges $124_1$, $124_2$) that are aligned with the spans $106_1$, $106_2$ (e.g., that overlap in the cross width 112 direction) and that have relatively sharp or pointed profiles (e.g., for air scraping). In one arrangement, the first edge portions $132_1/136_1$, $132_2/136_2$ of each of the first and second modules $104_1$, $104_2$ may have a length that is at least as long as a length of the spans $106_1$, $106_2$ of elements, such as at least twice as long, or at least four times as long.

As discussed previously, close contact between the tape head 100 and portions of the tape 100 not being read or written to by the spans $106_1$, $106_2$ of elements unnecessarily increases friction between the tape head 100 and these portions and can create complications with the precise control of the lateral position of the tape head 100 relative to the tape 200, among other inefficiencies. In this regard, another region of the first edge $124_1$ of the first module $104_1$ includes at least a second edge portion $140_1$ that is offset from or otherwise non-overlapping with the first edge portion $132_1$ (as well as with the span $106_1$ of transducers of the first module $104_1$) and that has a profile that is less sharp or otherwise softer than that of the first edge portions $132_1/136_1$, $132_2/136_2$ (e.g., a radius of curvature of at least about 0.2 mm), such as via rounding, curving, etc. such edge portions in any appropriate manner. Also, another region of the first edge $124_2$ of the second module $104_2$ includes at least a second edge portion $140_2$ that is offset from or otherwise non-overlapping with the first edge portion $132_2$ (as well as with the span $106_2$ of transducers of the second module $104_2$) and that has a profile that is less sharp or otherwise softer than that of the first edge portions $132_1/136_1$, $132_2/136_2$ (e.g., such as via rounding, curving, etc. such edge portions in any appropriate manner). Similarly, respective regions of the second edges $128_1$, $128_2$ of the first and second modules $104_1$, $104_2$ may include second edge portions $144_1$, $144_2$ that are opposite the second edge portions $140_1$, $140_2$ of the first edges $124_1$, $124_2$ and that also have profiles that are less sharp or otherwise softer than those of the first edge portions $132_1/136_1$, $132_2/136_2$.

In operation, for instance, a first portion of the tape 200 (e.g., first set of tracks) moving in the second direction 216 may pass over the first edge portion $136_1$ of the second edge $128_1$ of the first module $104_1$, continue in close contact with the upper surface $116_1$ and the span $106_1$ of transducers (e.g., where reading of and/or writing to the first portion of the tape 200 by the span $106_1$ may occur), and then pass over the first edge portion $132_1$ of the first edge $124_1$ of the first module $104_1$ (where the first edge portions $132_1/136_1$ scrape air to closely position the magnetic layer of the tape 200 adjacent the first portion of the tape 200 close to the span $106_1$ of transducers). In contrast, a second portion of the tape 200 (e.g., second set of tracks spaced from the first portion along the cross width 112), also moving in the second direction 216 simultaneously with the first portion, may pass over the second edge portion $144_1$ of the second edge $128_1$ of the first module $104_1$, continue over the upper surface $116_1$, and then pass over the second edge portion $140_1$ of the first edge $124_1$ of the first module $104_1$ (where the second edge portions $140_1/144_1$ create air layers between the upper surface $116_1$ adjacent the second portion of the tape 200 that reduce friction between the second portion and the upper surface $116_1$). See FIGS. 2a and 3.

Continuing with the tape 200 moving in the second direction 216, the first portion of the tape 200 may then pass over the second edge portion $140_2$ of the first edge $124_2$ of the second module $104_2$, continue over the upper surface $116_2$, and then pass over the second edge portion $144_2$ of the second edge $128_2$ of the second module $104_2$ (where the second edge portions $140_2/144_2$ create air layers between the upper surface $116_2$ adjacent the first portion of the tape 200 that reduce friction between the first portion and the upper surface $116_2$). Conversely, the second portion of the tape 200 may, simultaneously with the first portion of the tape 200 passing over the second edge portions $140_2/144_2$ and the upper surface $116_2$, pass over the first edge portion $132_2$ of the first edge $124_2$ of the second module $104_2$, continue in close contact with the upper surface $116_2$ and the span $106_2$ of transducers (e.g., where reading of and/or writing to the second portion of the tape 200 by the span $106_2$ may occur), and then pass over the first edge portion $136_2$ of the second edge $128_2$ of the second module $104_2$ (where the first edge portions $132_2/136_2$ scrape air to closely position the magnetic layer of the tape 200 adjacent the second portion of the tape 200 close to the span $106_2$ of transducers). The first and second spaced portions of the tape 200 may pass over and/or contact the first and second modules $104_1$, $104_2$ in a vice versa manner from that described above when the tape 200 travels in the first direction 212.

Figure 2B:
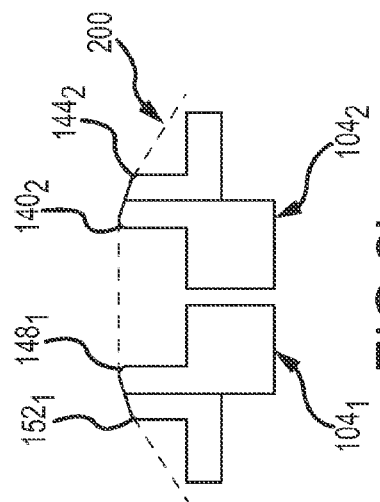
Figure 2C:
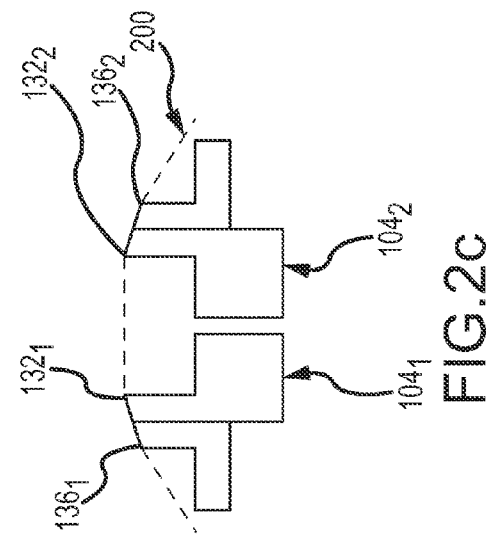
Figure 2A:
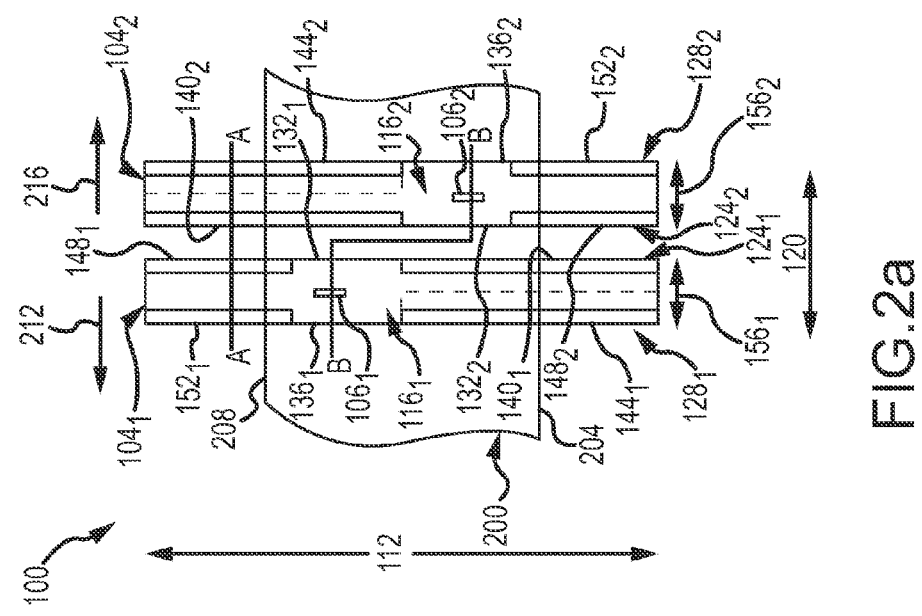
FIG. 2a is a simplified schematic plan view of a tape head of a tape drive according to an embodiment.
Figure 3:
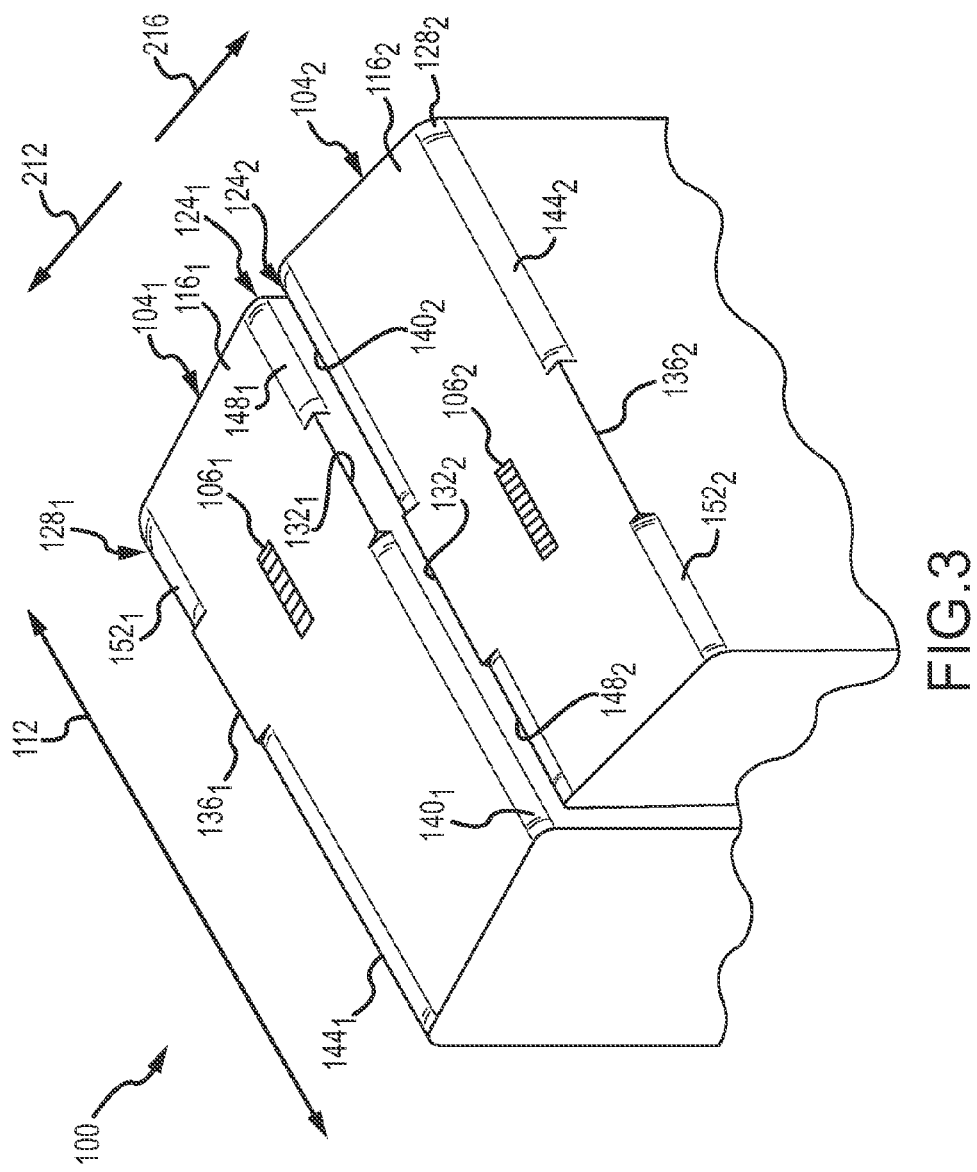
FIG. 3 is a perspective view of the tape head of FIGS. 2a-2c.

While each of the first and second edges $124_1/128_1$, $124_2/128_2$ of the first and second modules $104_1$, $104_2$ has been described as including at least first and second edge portions (where the first edge portions overlap the respective spans and are relatively sharp and where the second edge portions are offset from the spans and are less sharp than the first edge portions), additional edge portions may be included. For instance, and as shown in FIGS. 2a and 3, the first and second edges $124_1/128_1$, $124_2/128_2$ of the first and second modules $104_1/104_2$ may include third edge portions $148_1/152_1$, $148_2/152_2$ disposed opposite the second edge portions $140_1/144_1$, $140_2/144_2$ (e.g., on an opposite side of the respective spans $106_1/106_2$) and that also have a profile that is less sharp than that of the first edge portions $132_1/136_1$, $132_2/136_2$ (e.g., such as via rounding, tapering, curving, etc.). It can be seen how this arrangement advantageously reduces friction between the tape head 100 and outer portions of the tape 200 (e.g., near first and second lateral edges 204, 208) that are not being written to and/or read by the spans $106_1/106_2$ (e.g., depending upon a particular lateral position of the tape head 100 relative to the tape 200 in the cross width 112 direction)

The rounding or curving of the second and third edges portions of the first and second modules $104_1$, $104_2$ may be of any particular degree appropriate to induce the creation of air layers between the portions of the tape 200 traveling thereover in one of the first and second directions 212, 216 for corresponding friction reduction. In one arrangement, for instance, the rounded or curved profiles of one or more of the second and third edge portions of the first and second modules $104_1$, $104_2$ may extend up to about half of a land length $156_1$, $156_2$ of the upper surfaces $116_1$, $116_2$ of the first and second modules $104_1$, $104_2$. See FIG. 2a. However, lesser degrees of curving or rounding that are also configured to reduce friction between the tape 200 and the tape head 100 are also envisioned and encompassed in the present disclosure.

FIGS. 4a-4c present another embodiment of a tape head 100' for use in writing data to and/or reading data from a length of magnetic tape 200. In this embodiment, the first edge portions $136_1$', $136_2$' of the second edges $128_1$', $128_2$' of the first and second modules $104_1$, $104_2$ extend a substantial entirety of the length of the second edges $128_1$', $128_2$'. In this regard, a substantial entirety of the width of the tape 200 between the first and second lateral edges 204, 208 may be scraped or cleaned of debris by the first edge portions $136_1'$, $136_2'$ with the tape 200 moving in either of the first or second directions 212, 216. Furthermore, friction reductions may still result from implementation of the second and third edge portions $140_1/148_1$, $140_2/148_2$ of the first edges $124_1$, $124_2$ of the first and second modules $104_1$, $104_2$.

While only two respective offset spans $106_1$, $106_2$ of transducers on the first and second modules $104_1$, $104_2$ have been shown in the figures, it is to be understood that the teachings presented herein may also apply to various more complicated arrangements of offset transducer spans. With reference to FIG. 2a, for instance, assume the first module $104_1$ includes a second span of transducers spaced from the span $106_1$ along the cross width 112 direction, such as across from third edge portion $148_2$ of second module $104_2$. In this regard, the portions of second edge portions $140_1/144_1$ that are aligned with and overlap the second span (along the cross width 112) may be relatively sharp for scraping air and thereby positioning the magnetic layer of the tape 200 close to the second span as the tape 200 moves in one of the first and second directions 212, 216.

In one arrangement, the first and second modules $104_1$, $104_2$ may have a plurality of alternating offset spans of transducers (e.g., 4, 6, 8, etc.). In this arrangement, opposite edge portions of the first and second edges $124_1/128_1$, $124_2/128_2$ of the first and second modules $104_1$, $104_2$ that surround and overlap (along the cross width 112) each respective span of one of the first and second modules $104_1$, $104_2$ may be relatively sharp (e.g., like first edge portions $132_1/136_1$, $132_2/136_2$) while corresponding opposite edge portions of the other of the first and second modules $104_1$, $104_2$ may be less sharp (e.g., such as portions of second edge portions $140_2$, $144_2$ of second module $104_2$ across from first edge portions $132_1/136_1$ of first module $104_1$, and/or the like).

In one arrangement, and as shown in the figures, the relatively sharp opposite edge portions surrounding each respective span of transducers of one of the first and second modules $104_1$, $104_2$ may be fully offset from (e.g., non-overlapping with) the relatively sharp opposite edge portions surrounding an adjacent span of the other of the first and second modules $104_1$, $104_2$ along the cross width 112 direction (e.g., along a direction that is perpendicular too the first and second directions of travel 212, 216 of the tape 200, compare first edge portions $132_1/136_1$ of span $106_1$ of first module $104_1$ and first edge portions $132_2/136_2$ of span $106_2$ of second module $104_2$). In another arrangement, the relatively sharp opposite edge portions surrounding each respective span of transducers may only be partially offset from (e.g., may be partially but not fully overlapping with) those of an adjacent span of the other module. In a further arrangement, one or more transition regions between sharp and non-sharp edge portions may be appropriately rounded or tapered to limit damage to tape 200 moving thereover. With reference to FIG. 3, for instance, the pointed corners and/or short edges between first edge portion $132_1$ and each of second and third edge portions $140_1$, $148_1$ of first edge $124_1$ of first module $104_1$ may be appropriately smoothed, polished or the like to limit damage to tape 200 traveling thereover.

It will be readily appreciated that many additions and/or deviations may be made from the specific embodiments disclosed in the specification without departing from the spirit and scope of the invention and that the illustrations and discussion herein has only been provided to assist the reader in understanding the various aspects of the present disclosure. The various uses of "first," "second," etc. (e.g., "first edge portion," "second edge portion," "third edge portion," etc.) have, unless otherwise specified herein, merely been used to facilitate the reader's understanding of the disclosed embodiments and do not necessarily connote any specific order of components. For instance, it is noted in FIG. 3 how reference numerals $132_1$ and $140_1$ have been respectively referred to previously as the first and second edge portions of the first edge $124_1$ of the first module $104_1$, and the reference numerals $136_1$ and $144_1$ have been respectively referred to previously as the first and second edge portions of the second edge $128_1$ of the first module $104_1$. However, the reference numerals $132_1$, $140_1$, and $136_1$ could also be referred to as the first edge portion, second edge portion, and third edge portion, respectively, of the first module $104_1$ as a whole. Furthermore, one or more various combinations of the above discussed arrangements and embodiments are also envisioned. Still further, the figures presented herein are not necessarily drawn to scale.

The tape drive 10 may be operated to read data from and/or write data to the tape 14 (e.g., tape 200) by one or more computer program products, i.e., one or more modules of computer program instructions encoded on a computer-readable medium for execution by, or to control the operation of, data processing apparatus (one or more processors). The computer-readable medium can be a machine-readable storage device, a machine-readable storage substrate, a non-volatile memory device, a composition of matter affecting a machine-readable propagated signal, or a combination of one or more of them. In this regard, the host 20, tape drive 10, and the like may encompass one or more apparatuses, devices, and machines for processing data, including by way of example a programmable processor, a computer, or multiple processors or computers. In addition to hardware, the host 20, tape drive 10, and the like may include code that creates an execution environment for the computer program in question, e.g., code that constitutes processor firmware, a protocol stack, a database management system, an operating system, or a combination of one or more of them.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The above described embodiments including the preferred embodiment and the best mode of the invention known to the inventor at the time of filing are given by illustrative examples only.

We claim:

1. A magnetic head for performing at least one of reading operations and writing operations on a magnetic tape, comprising:
   a first module including a body with an upper surface and a span of transducers on the upper surface that is configured to face a magnetic tape traveling over the upper surface along a direction of travel, wherein the upper surface includes at least a first edge portion having a first profile in a first region aligned with the span of transducers, wherein the upper surface includes at least a second edge portion having a second profile in a second region that is offset from the first region along a direction that is perpendicular to the direction of travel, wherein the first profile is sharper than the second profile, and wherein the first profile of the first edge portion extends along at least an entirety of a length of the span of transducers of the first module; and a second module including a body with an upper surface and a span of transducers on the upper surface that is configured to face the magnetic tape traveling over the upper surface along the direction of travel, wherein the upper surface includes at least a first edge portion having a first profile in a first region aligned with the span of transducers, wherein the upper surface includes at least a second edge portion having a second profile in a second region that is offset from the first region along a direction that is perpendicular to the direction of travel, wherein the first profile is sharper than the second profile, wherein the first profile of the first edge portion extends along at least an entirety of a length of the span of transducers of the second module, and wherein the span of recording transducers of the first module is at least partially offset from the span of transducers of the second module along the direction perpendicular to the direction of travel.

2. The magnetic head of claim 1, wherein the upper surface of the first module has a first edge that includes the first and second edge portions of the upper surface of the first module.

3. The magnetic head of claim 2, wherein the upper surface of the second module has a first edge that includes the first and second edge portions of the upper surface of the second module.

4. The magnetic head of claim 3, wherein the first edge portion of the upper surface of the first module is at least partially offset from the first edge portion of the upper surface of the second module along the direction perpendicular to the direction of travel.

5. The magnetic head of claim 4, wherein the first edge portion of the upper surface of the first module is fully offset from the first edge portion of the upper surface of the second module along the direction perpendicular to the direction of travel.

6. The magnetic head of claim 4, wherein the upper surface of the first module includes at least a third edge portion having a third profile in a third region that is offset from the first region along a direction that is perpendicular to the direction of travel, and wherein the first profile is sharper than the third profile.

7. The magnetic head of claim 6, wherein the second edge portion of the upper surface of the first module is disposed on a first side of the first edge portion of the upper surface of the first module, and wherein the third edge portion of the upper surface of the first module is disposed on an opposite second side of the first edge portion of the upper surface of the first module.

8. The magnetic head of claim 4, wherein the upper surface of the first module includes at least a third edge portion having a third profile in a third region aligned with the span of transducers of the first module, wherein the upper surface of the first module includes at least a fourth edge portion having a fourth profile in a fourth region that is offset from the third region along a direction that is perpendicular to the direction of travel, and wherein the third profile is sharper than the fourth profile.

9. The magnetic head of claim 8, wherein the upper surface of the second module includes at least a third edge portion having a third profile in a third region aligned with the span of transducers of the second module, wherein the upper surface of the second module includes at least a fourth edge portion having a fourth profile in a fourth region that is offset from the third region along a direction that is perpendicular to the direction of travel, and wherein the third profile is sharper than the fourth profile.

10. The magnetic head of claim 3, wherein the upper surface of the first module has a second edge that is parallel to the first edge of the upper surface of the first module, wherein the second edge of the upper surface of the first module has a profile that is sharper than the second profile of the second edge portion of the first edge of the upper surface of the first module, wherein the upper surface of the second module has a second edge that is parallel to the first edge of the second module, and wherein the second edge of the upper surface of the second module has a profile that is sharper than the second profile of the second edge portion of the first edge of the upper surface of the second module.

11. The magnetic head of claim 10, wherein an entirety of the second edge of the upper surface of the first module has a profile that is sharper than the second profile of the second edge portion of the first edge of the upper surface of the first module, and wherein an entirety of the second edge of the upper surface of the second module has a profile that is sharper than the second profile of the second edge portion of the first edge of the upper surface of the second module.

12. The magnetic head of claim 10, wherein the first edges of the upper surfaces of the first and second modules are disposed inside of the second edges of the upper surfaces of the first and second modules.

13. A method of operating a tape drive, comprising:
first moving a tape over a first module of a tape head, wherein the first moving includes:
passing a first track of the tape over a span of transducers of the first module;
passing the first track over a first edge portion of the first module;
passing a second track of the tape over a second edge portion of the first module, wherein the second track of the tape is spaced from the first track of the tape along a reference line that is perpendicular to first and second opposite lateral edges of the tape, and wherein the first edge portion of the first module is sharper than the second edge portion of the first module;
passing the first track of the tape over a third edge portion of the first module, wherein the third edge portion of the first module is opposite the first edge portion of the first module, and wherein the third edge portion is sharper than the second edge portion; and
passing the second track of the tape over a fourth edge portion of the first module, wherein the fourth edge portion of the first module is opposite the second edge portion of the first module; and
second moving the tape over a second module of the tape head, wherein the second moving includes:
passing the second track of the tape over a first edge portion of the second module;
passing the second track of the tape over a span of transducers of the second module; and
passing the first track of the tape over a second edge portion of the second module, wherein the first edge portion of the second module is sharper than the second edge portion of the second module.

14. The method of claim 13, wherein the first and second tracks of the tape are respectively passed over the first and second edge portions of the first module substantially simultaneously, and wherein the first and second tracks of the tape are respectively passed over the second and first edge portions of the second module substantially simultaneously.

15. The method of claim 13, wherein the first edge portion of the first module extends along at least an entirety of a length of the span of transducers of the first module.

16. The method of claim 15, wherein the first edge portion of the second module extends along at least an entirety of a length of the span of transducers of the second module.

17. A magnetic head for a tape drive, comprising:

a first module including first and second opposite edges and a span of transducers between the first and second edges, wherein first portions of the first and second edges that overlap the span of transducers along a length of the first module have a first profile, wherein second portions of the first and second edges that do not overlap the span of transducers along the length of the first module have a second profile, and wherein the first profile is sharper than the second profile, and wherein the first profile of the first portions extends along at least an entirety of a length of the span of transducers of the first module; and a second module including first and second opposite edges and a span of transducers between the first and second edges, wherein first portions of the first and second edges that overlap the span of transducers along a length of the second module have a first profile, wherein second portions of the first and second edges that do not overlap the span of transducers along the length of the second module have a second profile, wherein the first profile is sharper than the second profile, wherein the first profile of the first portions extends along at least an entirety of a length of the span of transducers of the second module, and wherein the first portions of the first module and the first portions of the second module are at least partially non-overlapping along the lengths of the first and second modules.

18. The magnetic head of claim 17, wherein the span of transducers of the first module and the span of transducers of the second module are at least partially non-overlapping along the lengths of the first and second modules.

19. The magnetic head of claim 17, wherein the first portion of the first module and the second portion of the second module are disposed on a line that is perpendicular to the lengths of the first and second modules.

* * * * *